United States Patent

Hubby

[11] 4,347,098
[45] Aug. 31, 1982

[54] SOLVENT VAPOR RECOVERY FROM A POLYMER SOLUTION

[75] Inventor: John S. Hubby, Cronulla, Australia

[73] Assignee: Phillips Petroleum Company, Bartlesville, Okla.

[21] Appl. No.: 177,956

[22] Filed: Aug. 14, 1980

[51] Int. Cl.³ .............................................. B01D 1/14
[52] U.S. Cl. .......................... 159/16 S; 159/DIG. 10; 159/24 B; 528/500
[58] Field of Search .................. 59/16 R, 16 S, 24 B, 59/DIG. 10; 528/500

[56] References Cited

U.S. PATENT DOCUMENTS

| | | | |
|---|---|---|---|
| 2,401,754 | 6/1946 | Green | 159/16 S |
| 2,776,224 | 10/1956 | Bannon | 528/500 |
| 3,462,347 | 8/1969 | Chapman et al. | 203/6 |
| 3,590,026 | 6/1971 | Carlson et al. | 528/500 |
| 3,763,016 | 10/1973 | Hair | 159/16 S |
| 3,772,262 | 2/1971 | Clementi | 159/16 S |
| 3,800,845 | 4/1974 | Scoggin | 159/47 |

Primary Examiner—Norman Yudkoff

[57] ABSTRACT

A method and apparatus for recovering vapors from a polymer solution comprising liquid solvent and polymer.

10 Claims, 1 Drawing Figure

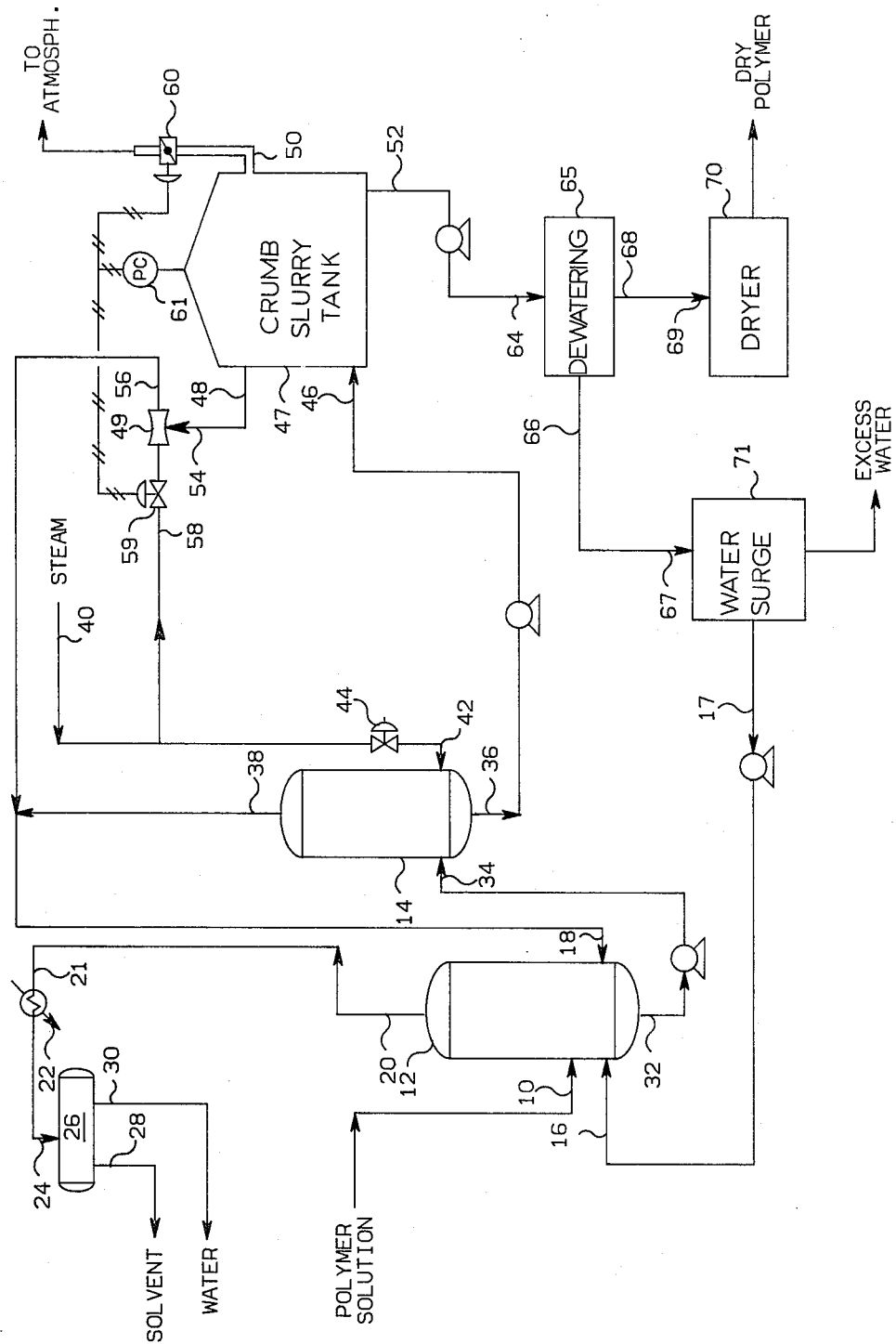

SOLVENT VAPOR RECOVERY FROM A POLYMER SOLUTION

BACKGROUND OF THE INVENTION

This invention relates to a method and apparatus for recovering vapors from a polymer solution. In another aspect the invention relates to a method and apparatus for the recovery of solvent vapors and water vapors from a polymer slurry using steam strippers. In still another aspect this invention relates to a method and apparatus for the reduction of the amount of steam necessarily introduced into the strippers to effect solvent separation.

The production of polymer in crumb form is well known. Existing processes generally utilize steam stripping of a polymer solution to remove and to recover the hydrocarbon solvent. The polymer is coagulated in this process to form a solid crumb which is suspended in water as a slurry. This slurry is subsequently processed in dewatering and drying equipment for final polymer recovery.

A typical process involves polymerizing a monomer system such as for example one comprising one or more conjugated dienes in a solution medium and the recovery of the polymer from the solution in which they are produced. Recovery is generally accomplished by steam stripping the polymer solution. In a typical steam stripping process, a polymer solution comprising polymer and liquid solvent, and water are introduced into a primary stripper operating slightly above atmospheric pressure. By using steam as a stripping medium, a substantial portion of the solvent is removed from the polymer solution in the primary stripper. The water and solvent vapors from the primary stripper are passed to suitable purification and recovery means. The bottom product, now in slurry form and now relatively lean in solvent, is passed to a secondary stripper where steam is again introduced to effect solvent separation. In existing processes some of the vapors are recovered from the secondary stripper and are introduced into the vapor zone of the primary stripper. Although a substantial portion of the vapors are recovered from the secondary stripper, the bottoms product from the secondary stripper still contains some solvent which is ultimately removed from the system and lost during final processing of the polymer.

An object of this invention is a method and apparatus for reducing the cost of operating a polymerization process. Another object of this invention is a method and apparatus for recovering polymerization solvent.

STATEMENT OF THE INVENTION

According to the invention solvent vapors are recovered from a polymer solution comprising liquid solvent and polymer by passing a first polymer slurry comprising water, polymer and liquid solvent to a first polymer recovery zone; vaporizing at least a portion of the liquid solvent in the first polymer slurry with steam in the first polymer recovery zone to produce water vapor, solvent vapor and a second polymer slurry comprising water, polymer and liquid solvent; passing the second polymer slurry from the first polymer recovery zone at a first pressure to a second polymer recovery zone at a second pressure, said second pressure being a lower pressure than said first pressure; vaporizing at least a portion of the water and liquid solvent in the second polymer slurry in the second polymer recovery zone to produce water vapor, solvent vapor and a third polymer slurry comprising polymer crumb and water; passing the water vapor and the solvent vapor from the second polymer recovery zone to a vapor recovery zone; recovering the water vapor and the solvent vapor from the second polymer recovery zone; combining the water vapor and the solvent vapor from the second polymer recovery zone with water vapor and solvent vapor from the first polymer recovery zone; and introducing the combined vapors as a stripping vapor in a third polymer recovery zone at a third pressure to produce the first polymer slurry from the polymer solution.

Further according to the invention, apparatus comprises a first vessel having a product inlet, product outlet and a vapor outlet; a second vessel having a product inlet, a first vapor outlet, and a product outlet; and a recovery means having a vapor inlet and a vapor outlet, wherein said product inlet of said second vessel is in communication with said product outlet of said first vessel, said first vapor outlet of said second vessel is in communication with said vapor inlet of said recovery means, and said vapor outlet of said recovery means is connected to said vapor outlet of said first vessel.

BRIEF DESCRIPTION OF THE DRAWING

FIG. 1 is a diagram of an embodiment of the vapor recovery system according to the invention.

DETAILED DESCRIPTION OF THE INVENTION

Referring to FIG. 1, a first polymer solution comprising liquid solvent and polymer is passed through product inlet 10 to primary stripper 12 having a product outlet 32, a vapor inlet 18, a vapor outlet 20 and a recycle water inlet 16. Vapor inlet 18 is in communication with the vapor outlet 38 of the secondary stripper 14, recycle water inlet 16 is in communication with the water outlet 17 of a water surge tank 7; having a water inlet 67 and a water outlet 17, and vapor outlet 20 is in communication with a condensing means 22 having a vapor inlet 21 and a liquid outlet 24. Liquid outlet 24 is in communication with a decanting means 26, having a first outlet 28 and a second outlet 30. First outlet 28 is in communication with a solvent storage means (not shown) and second outlet 30 is in communication with a water storage means (not shown). Product outlet 32 is in communication with the product inlet 34 of a secondary stripper 14, having a product inlet 34, a product outlet 36 a vapor outlet 38 and a first steam inlet 42 having a steam valve 44, which is connected to a steam source 40.

Vapor outlet 38 is in communication with vapor inlet 18 of the primary stripper 12. Product outlet 36 is in communication with the product inlet 46 of a crumb slurry tank 47 having a product inlet 46, a first vapor outlet 48, a second vapor outlet 50 and product outlet 52. First vapor outlet 48 is in communication with the vapor inlet 54 of a recovery means 49 having a vapor inlet 54, vapor outlet 56 and a second steam inlet 58, and wherein the recovery means is a steam jet ejector 49. Second vapor outlet 50 is in communication with the atmosphere. Second steam inlet 58 is in communication with first steam inlet 42.

In accordance with the present invention vapor outlet 56 of recovery means 49 is in communication with vapor outlet 38 of secondary stripper 14 and vapor inlet 18 of primary stripper 12.

In accordance with another aspect of the present invention means for monitoring the vapor pressure in the crumb slurry tank 47 is operatively connected to a steam valve means 59, which is located on second steam inlet 58, and a relief valve means 60 which is located on second vapor outlet 50. A pressure controller 61 is used to monitor the vapor pressure in crumb slurry tank 47 by measuring the static pressure therein and by generating in response to the intensity of the vapor pressure a first signal, the first signal being used to proportionally control the flow of steam through the second steam inlet 58 to steam jet ejector 49 by manipulating the steam valve 59. When vapor pressure in crumb slurry tank 47 exceeds a predetermined set point a second signal is generated, the second signal being used to open relief valve 60.

Product outlet 52 of the crumb slurry tank 47 is in communication with the inlet of a dewatering means 65 having an inlet 64, a water outlet 66, and a product outlet 68. Product outlet 68 is in communication with the product inlet 69 of a drying means 70 having an inlet 69, and water outlet 66 of dewatering means 65 is in communication with the water inlet 67 of a water surge tank 71 having a water inlet 67 and a recycle outlet 17 which is in communication with the recycle inlet 16 of the primary stripper 12, thus maintaining a liquid phase in primary stripper 12.

Operating conditions for the stripping process should be such that the residual solvent in the polymer crumb leaving the crumb slurry tank is less than one percent. This will reduce the cost of the stripping process by recovering at least 99 percent of the liquid solvent.

While the invention is useful for recovering solvent from a variety of polymer-solvent systems, the invention is particularly suitable for recovering a solvent such as for example n-hexane in a butadiene-styrene polymer-n-hexane system. The rate of steam necessary to vaporize the n-hexane solvent in the butadiene-styrene polymer in the primary and secondary strippers varies according to a number of process parameters, such as for example the polymer feed rate, the polymer-solvent ratio, the temperatures and pressures in the particular stripper, the temperature of the steam used to vaporize the solvent and the recycle water rates.

The following temperatures and pressures are those typically employed in recovering n-hexane solvent from a butadiene-styrene system. The primary stripper can be operated at a temperature within the range of from 160° F. to 240° F. (71° C.–116° C.) and within a pressure range of from 5 to 30 psia (34–207 KiloPaschels) (kPa). The preferred temperature is within the range of from 180° F. to 210° F. (82° C. to 99° C.) and the preferred pressure is within the range of from 10 to 20 psia (69–138 kPa). These preferred ranges will reduce the n-hexane solvent content in the butadiene-styrene polymer to a range of from 2 to 15 weight percent based on the total weight of the butadiene-styrene polymer.

The secondary stripper can be operated at a temperature within the range of from 210° F. to 240° F. (71° C.–116° C.) and within a pressure range of from 16 to 25 psia (112 to 170 kPa). The preferred temperature is within the range of from 225° F. to 250° F. (107° C. to 121° C.). These preferred operating temperature ranges will reduce the n-hexane solvent content in the butadiene-styrene polymer passed from the secondary stripper to the crumb slurry tank to a range of from 0.1 to 1.0 weight percent based on the total weight of the butadiene-styrene polymer. n-Hexane is further removed from the butadiene-styrene polymer by vaporizing the butadiene-styrene polymer in the crumb slurry tank to produce water vapor, solvent vapor and a third polymer slurry comprising polymer crumb and water.

The crumb slurry tank can be operated at a temperature within the range of from 210° F. to 220° F. (99° C. to 104° C.) and at a pressure which is essentially atmospheric. These conditions will reduce the residual solvent in the butadiene-styrene polymer leaving the crumb slurry tank from about 2 to 15 weight percent to less than one weight percent based on the total weight of the butadiene-styrene polymer.

In a calculated example of the invention employing the embodiment of FIG. 1 and using n-hexane solvent butadiene-styrene polymer system, water vapor and solvent vapor are recovered from the crumb slurry tank and introduced as a stripping vapor in the primary stripper by a steam jet ejector system such as is manufactured by Worthington Corporation of Harrison, N.J. The following table is an example of the benefits realized when vapors are recovered from the crumb slurry tank and used as stripping vapor in a two-stage steam stripping process.

|  | Two-Stage Stripping With Recovery | Two-Stage Stripping |
|---|---|---|
| Fresh Steam to Strippers, Kg/hr | 10,726 | 12,260 |
| Fresh Steam to Ejector, Kg/hr | 240 | — |
| Total Fresh Steam, Kg/hr | 10,966 | 12,260 |
| Ejector Effluent Steam to Strippers, Kg/hr | 1,540 | — |
| Total Stripping Steam, Kg/hr | 12,266 | 12,260 |
| N-Hexane Vapor to Atmosphere, Kg/hr | Nil | 21 |
| Steam to Atmosphere, Kg/hr | Nil | 1,300 |

The two-stage stripping process with vapor recovery from the crumb slurry tank is represented in FIG. 1 by vapor inlet 54, steam jet ejector 49, steam inlet 58, vapor outlet 56 and other process apparatus. The two-stage stripping process without vapor recovery is represented in FIG. 1 by crumb slurry tank 47 and second vapor outlet 50 which was originally vented to the atmosphere.

In the example shown, the net steam makeup is reduced from 4.09 Kg steam/Kg butadiene-styrene polymer to 3.66 Kg steam/Kg butadiene-styrene polymer, a reduction of 10.6 percent. The improved method requires less than 90 percent of the steam used in the standard two-stage stripping process and n-hexane solvent vapor loss is virtually eliminated.

For the steam stripping process above, the operating pressure for the primary stripper will be 19 psia (132 kPa) for the secondary stripper 26 psia (180 kPa) and the crumb slurry tank pressure will be essentially atmospheric. These pressures correspond with the steam stripping process material balance set forth below. Also note that the stream identification numbers directly correspond with those disclosed in FIG. 1.

STEAM STRIPPING PROCESS

Material Balance: All Quantities Kg/Hr

| Steam No: | 10 | 16 | 20 | 32 | 42 | 40 | 58 | 36 | 50 | 56 | 64 | 68 | 66 |
|---|---|---|---|---|---|---|---|---|---|---|---|---|---|
| Conditions As Per Invention | | | | | | | | | | | | | |
| Steam | — | — | 6666 | — | 10726 | 10966 | 240 | — | 0 | 1540 | — | — | — |
| Water | — | 28900 | — | 33250 | — | — | — | 34500 | — | — | 33200 | 300 | 32900 |
| Polymer | 3000 | — | — | 3000 | — | — | — | 3000 | — | — | 3000 | 3000 | — |
| Solvent | 20000 | — | 19991 | 300 | — | — | — | 30 | — | 21 | 9 | 9 | — |
| Temp. °C. | 60 | 85 | 90 | 90 | 138 | 138 | 138 | 120 | — | 108 | 100 | 92 | 92 |
| Conditions As Per Existing Process | | | | | | | | | | | | | |
| Steam | — | — | 6660 | — | 12260 | 12260 | — | — | 1300 | — | — | — | — |
| Water | — | 28900 | — | 33250 | — | — | — | 34500 | — | — | 33200 | 300 | 32900 |
| Polymer | 3000 | — | — | 3000 | — | — | — | 3000 | — | — | 3000 | 3000 | — |
| Solvent | 20000 | — | 19970 | 300 | — | — | — | 30 | 21 | — | 9 | 9 | — |
| Temp. °C. | 60 | 85 | 90 | 90 | 138 | 138 | — | 120 | 100 | — | 100 | 92 | 92 |

I claim:

1. Apparatus comprising:
   a first polymer receiving vessel having a product inlet, a steam inlet, a product outlet and a vapor outlet;
   a second polymer receiving vessel having a product inlet in flow communication with the product outlet of the first polymer receiving vessel, a product outlet and a first vapor outlet;
   a third polymer receiving vessel having a product inlet, a product outlet in flow communication with the product inlet of the first polymer receiving vessel, and a vapor outlet;
   means for fluid flow between the vapor outlet of the first polymer receiving vessel and the third polymer receiving vessel;
   vapor recovery means having a vapor inlet in flow communication with the first vapor outlet of the second polymer receiving vessel and a vapor outlet in flow communication with the third polymer receiving vessel via the means for fluid flow between the vapor outlet of the first polymer receiving vessel and the third polymer receiving vessel.

2. Apparatus according to claim 1 wherein the vapor recovery means is a steam jet ejector.

3. Apparatus according to claim 2 further comprising means for introducing steam into the steam jet ejector.

4. Apparatus according to claim 1 in which the first and third polymer receiving vessels are steam-stripping vessels and the second polymer receiving vessel is a polymer crumb slurry tank.

5. Apparatus according to claim 4 in which the first polymer receiving vessel has a water inlet in flow communication with a water surge tank.

6. Apparatus according to claim 5 in which the product outlet of the second polymer receiving vessel is in flow communication with apparatus for removing water from the product.

7. Apparatus according to claim 4 further comprising:
   means for monitoring vapor pressure in the second polymer receiving vessel; and
   means for passing steam from a steam source to the vapor recovery means in response to a predetermined vapor pressure.

8. Apparatus according to claim 7 wherein the vapor recovery means is a steam jet ejector having a steam inlet.

9. Apparatus according to claim 8 wherein the monitoring means is a pressure control means operative to measure static pressure in the second polymer receiving vessel and to release vapor therefrom via the first vapor outlet in response to a predetermined measured vapor pressure.

10. Apparatus according to claim 9 wherein the pressure control means is operative to generate a first signal in response to a predetermined measured vapor pressure to proportionally control the flow of steam from the steam inlet to the steam jet ejector and to generate a second signal in response to a second predetermined measured vapor pressure to release vapor via a vapor relief outlet in the second polymer receiving vessel.

* * * * *